Dec. 31, 1968   J. W. WOOD, JR   3,419,235
ACOUSTIC CONTROL APPARATUS
Filed June 12, 1967   Sheet 3 of 3

Inventor:
John W. Wood, Jr.
by John E. Toupal
Attorney

---
United States Patent Office 3,419,235
Patented Dec. 31, 1968

---

3,419,235
ACOUSTIC CONTROL APPARATUS
John W. Wood, Jr., 326 Lexington St.,
Waltham, Mass. 02154
Filed June 12, 1967, Ser. No. 645,118
16 Claims. (Cl. 244—138)

ABSTRACT OF THE DISCLOSURE

An acoustic control apparatus which reduces the descent rate of a parachute retarded falling load at a predetermined distance above an approaching surface. The apparatus either releases a portion of the descending load or fires retarding retrorockets in response to measurement of a predetermined time interval between sound energy transmission and corresponding echo reception.

---

This invention relates generally to acoustic ranging apparatus and, more particularly, relates to acoustic ranging apparatus for controlling the fall of parachute retarded descending loads.

There exist a variety of applications wherein it is desirable to perform a control function on a parachuting load at a given altitude above an approaching surface. Many of the applications occur in military operations and include, for example, the unmanned logistics drops of heavy equipment. Here it is frequently desirable to slow the fall of parachute stabilized rapidly-descending load by firing of retrorockets at a predetermined altitude thereby preventing damage to the parachuting load upon surface impact. A similar application entails the employment at predetermined altitudes of ballistic reserve parachutes to slow the descent rate of rapidly-falling parachute stabilized loads. Another such application involves the automatic release at a predetermined altitude of relatively heavy loads borne by a descending parachutist. By releasing such loads, for example, guns, ammunition, food, etc., the fall of the parachutist is decelerated and risk of impact injury is reduced. However, if the load is released prematurely, damage to the released equipment can occur. Therefore, the release time must be accurately determined.

Present techniques utilized for the above described applications are less than adequate. For example, the use of pressure sensitive fuses to actuate retrorockets is generally unsatisfactory because of the requirement for rather complicated deployment of explosives and the necessity that actuation be accomplished by mechanical contact with the approaching surface. Similarly, the use by parachutists of load supported extension lines which permit grounding of the supported load prior to landing of the parachutist is not completely acceptable. Because for practical reasons, the extension lines are limited in length to about 15-20 feet the time available for deceleration of the parachutist is limited. Thus, paratroppers cannot employ safely the fast initial descent rates which are desirable to reduce windage errors and military vulnerability. Also unsatisfactory is the manual release of loads at visibly estimated altitudes because of the human judgment required and because the technique is unsuitable for use under low-visibility conditions.

Other known techniques use barometric and timer releases to deploy parachutes at pre-set altitudes, especially in emergency escape systems. Such devices are impractical at low altitudes because of equipment complexity and the number of unknowns. They require an extremely accurate knowledge of terrain elevation and barometric pressure over the drop zone.

The object of this invention, therefore, is to provide a compact and relatively inexpensive control device which will automatically reduce the descent rate of a parachute retarded load a predetermined distance above the approaching surface.

One feature of this invention is the provision with a parachute retarded load of a control apparatus including a signal transmitter and receiver coupled with a sonic transducer adapted to direct sound waves toward the surface being approached by the descending load and to receive echo portions of the sound waves reflected therefrom. The apparatus further includes a sensing circuit which measures the time interval between transmission and reception of sound waves and upon detection of a certain predetermined such time interval activates an actuating device which reduces the descent rate of the falling load. This system can accurately and reliably produce control operations for the above described parachute applications in all types of visibility conditions and over all types of terrain.

Another feature of this invention is the provision of a control apparatus of the above featured type wherein the sensing circuit is adapted to produce from the transmitter a variable pulse repetition frequency (PRF) output which is inversely dependent upon the distance between the transducer and the approaching surface. A ranging system of this type provides extremely accurate sensing at low altitudes and is thereby uniquely suited for this application.

Another feature of this invention is the provision of an acoustic control apparatus of the above featured type wherein the sensing circuit is adapted to trigger an output signal pulse in response to reception by the transducer of an echo pulse. This arrangement permits effective range determination with relatively inexpensive components.

Another feature of this invention is the provision of an acoustic control apparatus of the above featured type wherein the sensing circuit activates the actuating device in response to reception by the transducer of echo pulses at a certain predetermined repetition frequency.

Another feature of this invention is the provision of an acoustic control apparatus of the above featured type wherein the sensing circuit initially operates in a detecting mode in which a stable output pulse repetition frequency is generated and, after initial reception of echo pulses by the transducer, in a ranging mode in which the variable output PRF is generated. The utilization of both detection and ranging modes permits substantial simplification of a required electrical circuitry.

Another feature of this invention is the provision of an acoustic control apparatus of the above featured type which is adapted for attachment to the harness of a parachute.

Another feature of this invention is the provision of an acoustic control apparatus of the above featured type wherein the actuating device detaches at least a portion of the descending load from the parachute at a predetermined altitude. This unit is uniquely suited for release from parachutists of excessive loads before impact with the surface.

Another feature of this invention is the provision of an acoustic control apparatus of the next above featured type wherein the actuating device produces on the parachute retarded load a force opposing the force of gravity. This unit, for example, triggers a retrorocket to decelerate an extremely heavy parachuting load.

These and other objects and features of the present invention will become more apparent upon a perusal of the following specification taken in conjunction with the accompanying drawings wherein.

Figure 1:
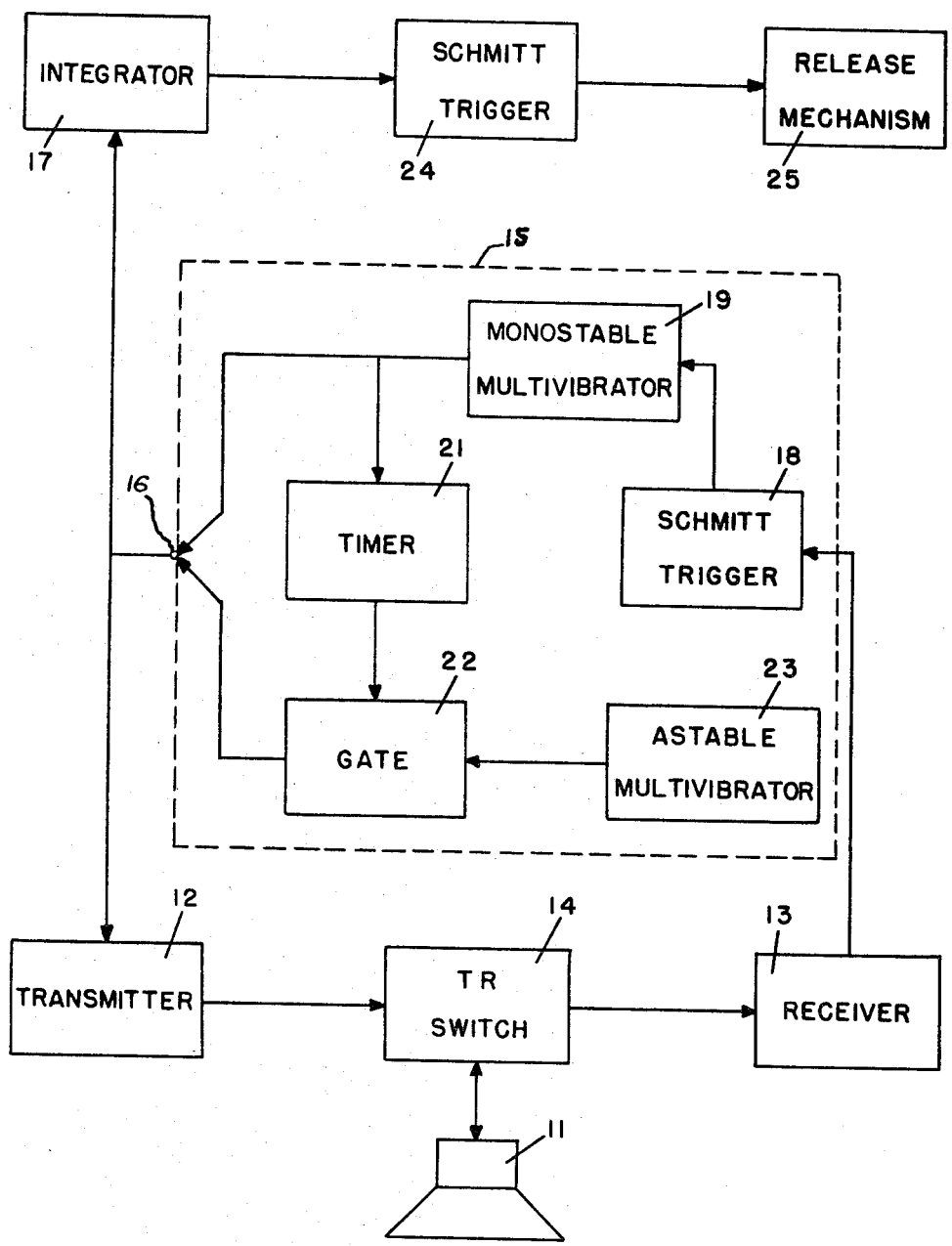
FIG. 1 is a schematic block circuit diagram of a preferred embodiment of the invention.

Referring now to FIG. 1 there is shown schematically the control device 10 having the sonic transducer 11 of, for example, the piezoelectric type coupled to either the transmitter 12 or the receiver 13 by the transmit-receive (TR) switch 14. The keyer circuit 15 has an output terminal 16 connected to the transmitter 12, the TR switch 14 and the integrator 17. Included in the keyer circuit 16 is the Schmitt trigger 18 which receives signals from the receiver 13 and controls the monostable multivibrator 19. The output of the monostable multivibrator 19 is transmitted to the output terminal 16 and to the timer 21 which controls the gate circuit 22. Normally, the gate 22 transmits signals from the astable multivibrator 23 to the output terminal 16. Output signals from the integrator 17 control the Schmitt trigger 24 which activates the release mechanism 25 as described in greater detail below.

Basically the invention operates in the following manner. A short pulse of ultrasonic sound is transmitted toward the ground by a directional transducer 11 of the unit 10 which is preferably mounted on the bottom of the parachute retarded descending load. The sound energy travels to the approaching landing surface at a velocity of approximately one foot per millisecond, and a portion of the sound is reflected back up to the transducer 11. By measuring the time interval between pulse transmission and echo reception, the distance to the approaching surface is easily determined and used to perform a suitable control function as described below.

Figure 2:
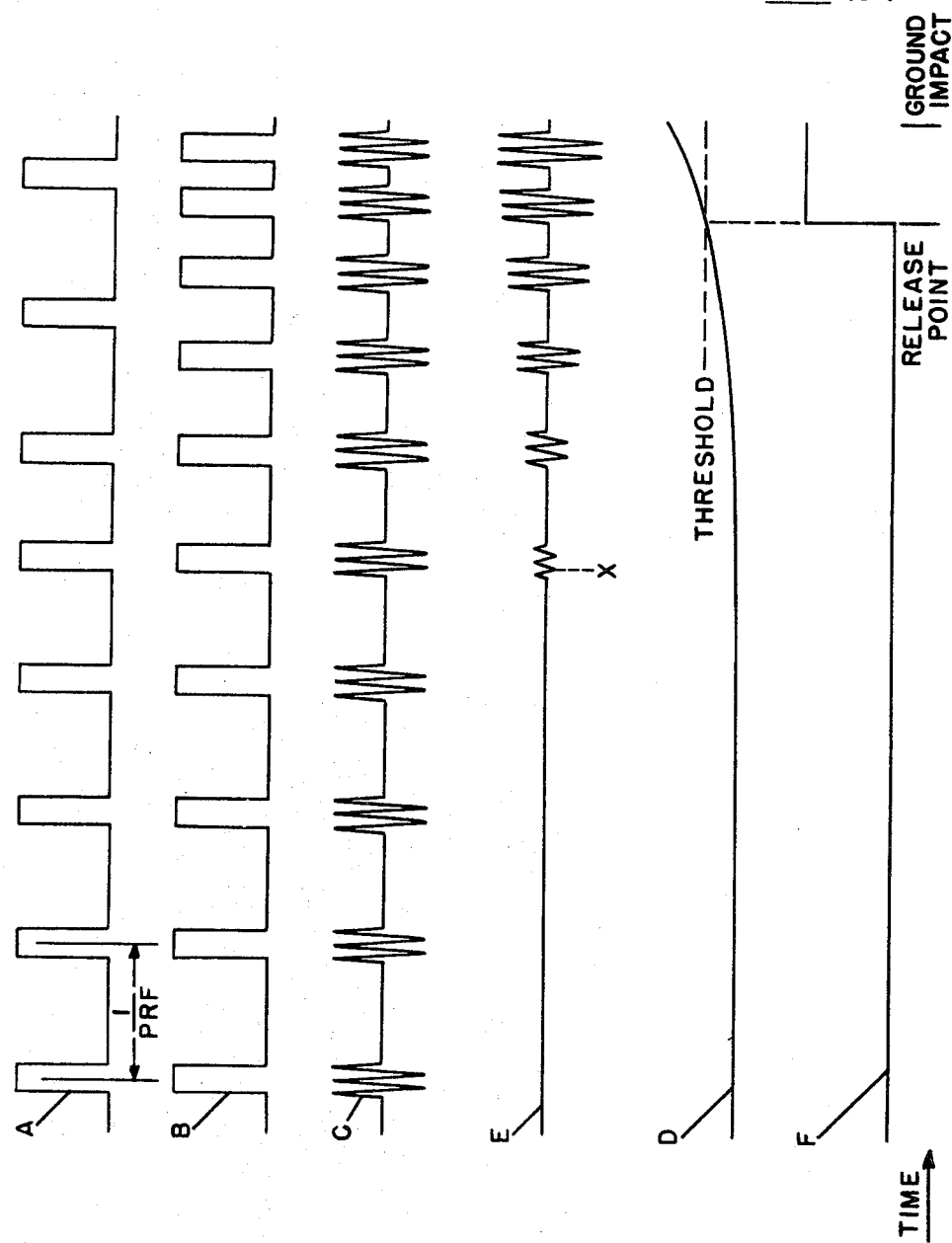
FIG. 2 illustrates a plurality of output waveforms provided by the circuit of FIG. 1.

After initial activation, the keyer circuit 15 operates in a range search mode during which there is generated a stable PRF (curve B, FIG. 2) determined by the rate-of-descent, transmitter 12 output, and receiver 13 sensitivity. It should be high enough to provide an adequate sampling rate, but not so high that an ambiguous range problem is encountered. The pulses are produced by the astable multivibrator 23 and, as shown by curve A in FIG. 2, are spaced at $1/PRF$ in time. This signal is passed by the normally open gate 22 and used to trigger output pulses (curve C, FIG. 2) from the transmitter 12 which includes a conventional ultrasonic oscillator and pulsed power amplifier. The same signal is fed to the integrator 17 which, in this operating mode, provides a steady DC output voltage (curve D, FIG. 2) and to the TR switch 14 causing it to connect the transducer 11 to the transmitter 12. Between pulses the TR switch 14 connects the transducer 11 to the receiver 13 during the listening part of the cycle. The receiver includes an amplifier tuned to the transmitted frequency plus the Doppler shift caused by the approaching surface. Receiver bandpass is wide enough to accommodate the transmitted pulse length and changes in Doppler shift caused by variations in the rate-of-descent. The output (curve E, FIG. 2) of the receiver 13 amplifier is detected and fed to the keyer 15.

When the device 10 nears the ground, the receiver echo output increases to a predetermined level illustrated by point $x$ on curve E, which switches the keyer 15 into the range tracking mode. In this mode, the transmitter 12 is keyed as soon as the echo from the surface is received so that the PRF becomes inversely proportional to the altitude of the parachute-borne load. The detected output of the receiver 13 is fed to the Schmitt trigger 18 in the keyer circuit 15. When the received signal exceeds the preset trigger level, the Schmitt trigger 18 is activated and keys the monostable multivibrator 19 having an output pulse length equal to the pulse length generated by the free-running astable multivibrator 23. The pulses from the multivibrator 19 are fed to the transmitter 12, the TR switch 14, and the integrator 17. In addition, they turn on the timer circuit 21 which generates pulses slightly longer than the $1/PRF$ interpulse period of the astable multivibrator 23. Thus, the timer 21 turns the gate 22 off and disconnects the astable multivibrator 23 from the keyer output terminal 16 during operation in the range tracking mode. The gate 22 remains off as long as the time between receiver 13 output pulses is less than the $1/PRF$ period set on the timer 21. The multivibrator output pulses also are fed to the integrator 17. When the integrator output voltage exceeds the predetermined threshold level of the Schmitt trigger 24, it produces an output voltage (curve F, FIG. 2) which is used to activate the release mechanism 25.

Figure 3:
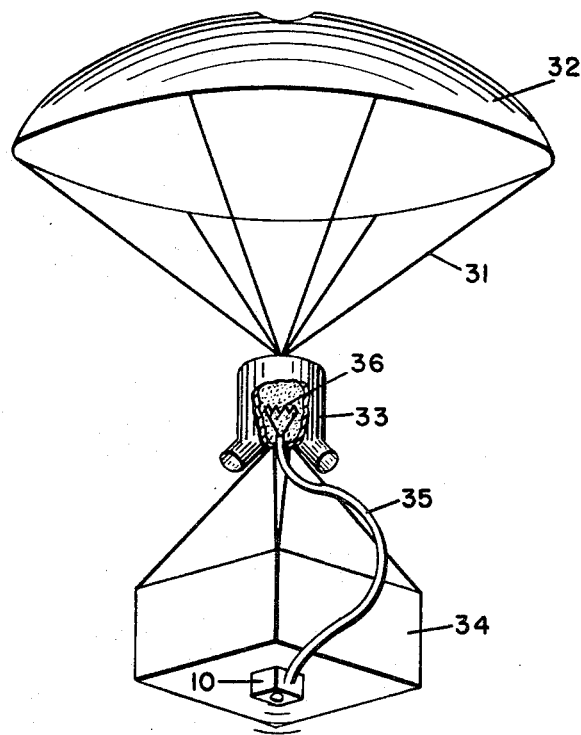
FIG. 3 is a schematic illustration of the invention used in a preferred application.
Figure 4:
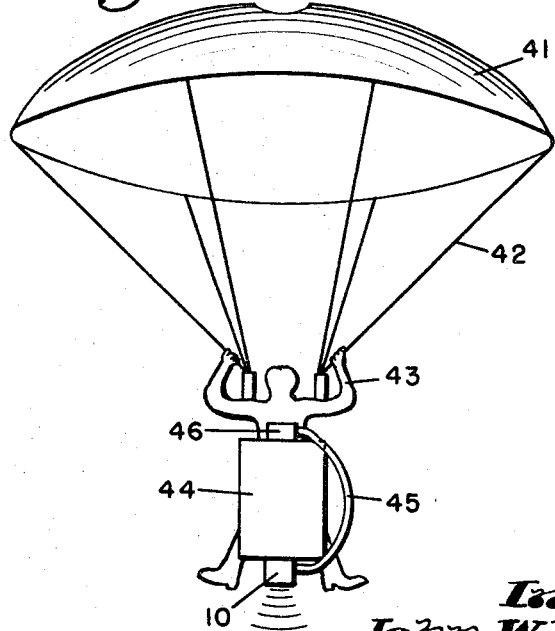
FIG. 4 is a schematic illustration of the invention used in another preferred application.

FIGS. 3 and 4 schematically illustrate examples of preferred control functions which can be performed by the release mechanism 25. As shown in FIG. 3, the harness 31 of the parachute 32 is attached to the retrorocket 33 which in turn supports the heavy load 34. Mounted beneath the load 34 is the control unit 10 having the output cable 35 connected to the squib filament 36 within the retrorocket 33. As described above, upon reaching a predetermined altitude above the surface approached by the load 34, the Schmitt trigger 24 produces an output voltage which is fed to the squib filament 36 by the cable 35. The heat generated by the filament 36 ignites the rocket fuel causing the rocket 33 to exert a gravity opposing force which decelerates the load 34.

In the embodiment shown in FIG. 4, the load attached to the parachute 41 by the harness 42 includes the parachutist 43 and the auxiliary load 44. Mounted beneath the auxiliary load 44 is the control unit 10 connected by the cable 45 to a conventional solenoid operated mechanical release 46 which attaches the auxiliary load 44 to the parachutist 43. As above, at a predetermined altitude the Schmitt trigger 24 in the control unit 10 produces an output voltage which energizes the solenoid actuated release mechanism 46. This detaches the parachutist 43 from the auxiliary load 44 permitting it to fall freely to the approaching surface. Because of this load reduction, the descent rate of the parachute 41 is reduced and, correspondingly, the impact experienced by the parachutist 43 upon touch-down is diminished.

The sonic ranging unit 10 for use in determining altitude is ideally suited to the environment of the parachute because no noisy engine is present to jam the device. Also a high frequency, above the human hearing range, is used so that the system radiates no audible sound and likewise is not susceptible to ambient noise. Furthermore, the low altitudes being measured, generally one hundred feet or less, insure that the delay time required to receive the echo is not excessive.

The above described range tracking unit exhibits unique advantages because of the increase in sampling rate as the system nears the ground. This is important because the relatively slow velocity of sound makes the accurate range determination of a moving target difficult using a system with fixed PRF. The number of range samples and, therefore, the accuracy of the release point increases near landing using the range tracker. A system with a fixed high PRF cannot be used without complex pulse coding or frequency diversity because of ambiguous range problems. Using a high PRF, it is difficult to tell which transmitted pulse generated the echo being received and, therefore, difficult to measure the range of the ground. The search mode with fixed PRF and tracking mode with variable PRF avoid these problems.

The present invention also has the advantage of being relatively invulnerable to jamming. A simple range-gated system does not have this advantage because a single sound with ultrasonic components such as a gun shot could cause premature release. Jamming the range tracker would require a rapid pulse train of ultrasonic bursts with PRF greater than that corresponding to the pre-set release altitude of the device. Such a sound could only be generated by intentional jamming, an unlikely circumstance unless the drop zone was heavily-occupied territory with prior knowledge of the air drop.

What is claimed is:

1. An acoustic control apparatus for use with a parachute retarded descending load and comprising an electrical signal transmitter means, a sonic transducer means coupled to said transmitter means and adapted to convert electrical output signals received therefrom into sound waves and to direct said sound waves toward the surface being approached by the descending load, said sonic transducer means being further adapted to receive echo portions of said sound waves reflected from the approaching surface and to convert said echo portions into electrical echo signals, a receiver means coupled to said transducer means and adapted to receive therefrom said echo signals, sensing circuit means coupled to said transmitter and receiver means and adapted to measure the time interval between transmission of output signals and reception of corresponding echo signals, said sensing means adapted to produce a keying output signal having a value proportional to said measured time intervals, threshold circuit means connected to receive said keying output signal and adapted at a predetermined threshold value thereof to produce an activating signal, and actuating means responsive to said activating signal to reduce the descent rate of the parachute retarded descending load.

2. An acoustic control apparatus according to claim 1 wherein said sensing circuit means comprises a pulse generator means adapted to feed to said transmitter means a variable output pulse repetition frequency which is inversely dependent upon the distance between said transducer and the surface being approached thereby.

3. An acoustic control apparatus according to claim 2 wherein said pulse generator means is adapted to trigger an output pulse in response to reception by said transducer means of an echo pulse.

4. An acoustic control apparatus according to claim 3 wherein said sensing circuit means comprises a pulse repetition frequency responsive means adapted to actuate said actuating means in response to reception by said transducer means of echo pulses at a certain predetermined repetition frequency.

5. An acoustic control apparatus according to claim 4 wherein said pulse generator means is adapted for initial operation in a first mode wherein a stable output pulse repetition frequency is generated and subsequently after reception of echo pulses by said transducer means, in a second mode wherein said variable output pulse repetition frequency is generated.

6. An acoustic control apparatus according to claim 1 wherein said actuating means is adapted to detach at least a portion of the descending load from the parachute.

7. An acoustic control apparatus according to claim 6 wherein said sensing circuit means comprises a pulse generator means adapted to feed to said transmitter means a variable output pulse repetition frequency which is inversely dependent upon the distance between said transducer and the surface being approached thereby.

8. An acoustic control apparatus according to claim 7 wherein said pulse generator means is adapted to trigger an output pulse in response to reception by said transducer means of an echo pulse.

9. An acoustic control apparatus according to claim 8 wherein said sensing circuit means comprises a pulse repetition frequency responsive means adapted to actuate said actuating means in response to reception by said transducer means of echo pulses at a certain predetermined repetition frequency.

10. An acoustic control apparatus according to claim 9 wherein said pulse generator means is adapted for initial operation in a first mode wherein a stable output pulse repetition frequency is generated and subsequently after reception of echo pulses by said transducer means, in a second mode wherein said variable output pulse repetition frequency is generated.

11. An acoustic control apparatus according to claim 1 wherein said actuating means is adapted to produce on the descending load a force opposing the force of gravity.

12. An acoustic control apparatus according to claim 11 wherein said sensing circuit means comprises a pulse generator means adapted to feed to said transmitter means a variable output pulse repetition frequency which is inversely dependent upon the distance between said transducer and the surface being approached thereby.

13. An acoustic control apparatus according to claim 12 wherein said pulse generator means is adapted to trigger an output pulse in response to reception by said transducer means of an echo pulse.

14. An acoustic control apparatus according to claim 13 wherein said sensing circuit means comprises a pulse repetition frequency responsive means adapted to actuate said actuating means in response to reception by said transducer means of echo pulses at a certain predetermined repetition frequency.

15. An acoustic control apparatus according to claim 14 wherein said pulse generator means is adapted for initial operation in a first mode wherein a stable output pulse repetition frequency is generated and subsequently after reception of echo pulses by said transducer means, in a second mode wherein said variable output pulse repetition frequency is generated.

16. An acoustic control apparatus according to claim 1 wherein said acoustic control apparatus is attached to a parachute harness.

References Cited

UNITED STATES PATENTS

| 2,568,926 | 9/1951 | Moran | 343—6 |
|---|---|---|---|
| 2,738,487 | 3/1956 | Hackley et al. | 340—3 |
| 3,015,463 | 1/1962 | Gross | 244—147 |
| 3,038,142 | 6/1962 | Wippert | 340—1 |
| 3,084,331 | 4/1963 | Dudley | 340—3 |
| 3,123,797 | 4/1964 | Ehrman | 340—1 |
| 3,156,442 | 11/1964 | Pourchet | 244—138 |
| 3,183,477 | 5/1965 | Ricalzone | 340—2 |

MILTON BUCHLER, *Primary Examiner.*

RICHARD A. DORNON, *Assistant Examiner.*

U.S. Cl. X.R.

244—151; 340—1